E. W. HOOKER.
PROCESS OF TREATING GRAIN.
APPLICATION FILED OCT. 10, 1911.
1,036,243.
Patented Aug. 20, 1912.
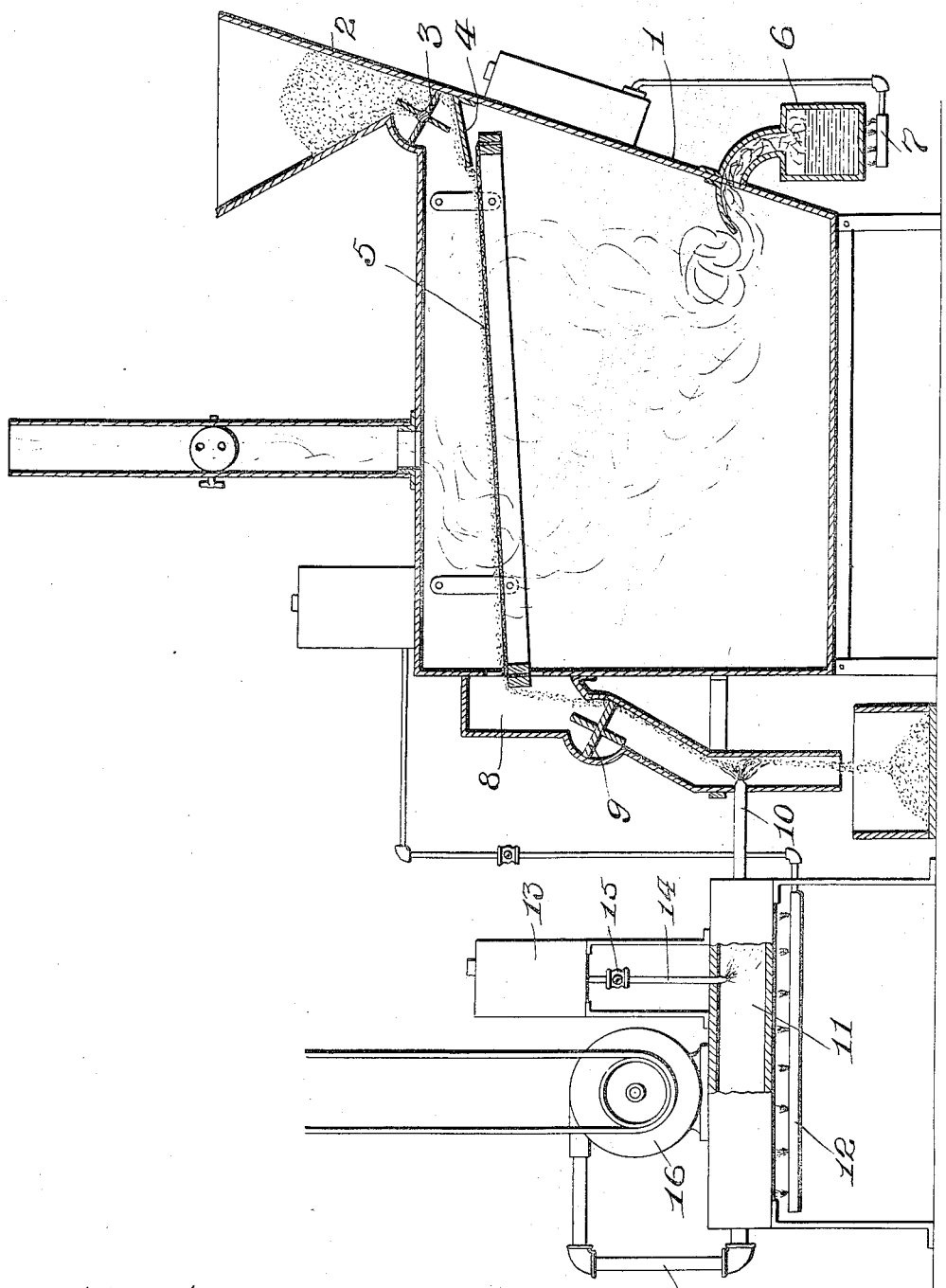

UNITED STATES PATENT OFFICE.

EDWARD W. HOOKER, OF ST. LOUIS, MISSOURI, ASSIGNOR OF ONE-HALF TO RICHARD H. KASTOR, OF ST. LOUIS, MISSOURI.

PROCESS OF TREATING GRAIN.

1,036,243.   Specification of Letters Patent.   Patented Aug. 20, 1912.

Application filed October 10, 1911. Serial No. 653,939.

*To all whom it may concern:*

Be it known that I, EDWARD W. HOOKER, a citizen of the United States, and resident of St. Louis, Missouri, have invented certain new and useful Improvements in Processes of Treating Grain, of which the following is a specification containing a full, clear, and exact description, reference being had to the accompanying drawings, forming a part hereof.

My invention relates to a process of treating grain for the purpose of destroying larvæ, weevil, or other insects and their germs, and it is especially applicable to rolled oats, rice, and the like.

It is well known that rolled oats, rice, and like substances are very frequently ruined for food purposes on account of insect germs which develop into larvæ, weevil and other insects.

It is the object of my invention to treat such substances, before packing, for the purpose of destroying the insect germ, larvæ and the weevil or insect developed therefrom.

The essential characteristic of my process is to subject the rolled oats or rice, or whatever substance is to be treated, before packing, to the action of a germicidal agent in the form of vapor or gas, and after the substance has been subjected to the action of this germicidal agent, to eliminate the mechanically held germicidal agent by a blast of hot air impregnated with a reagent.
The agent which I preferably employ to destroy the germ, larvæ, weevil, or other insect, is the vapor of formaldehyde, and to dispel or eliminate any of the formaldehyde which may be mechanically held, I subject the rolled oats, rice or other substances treated to the action of a blast of hot air impregnated with ammonia fumes or vapor.

In order that my process may be readily understood, I refer to the accompanying drawing, which represents in vertical section a conventional form of apparatus, by means of which my process may be carried out.

The apparatus consists of a chamber or container, such as 1, which carries a feed hopper 2 in which the rolled oats, rice, or substance to be treated, is placed. The material is fed from this hopper 2 by means of a wheel or paddle 3, which discharges the material in measured quantities onto a shelf or ledge 4, which is positioned above a vibrating screen 5 over which the material passes.

6 indicates a formaldehyde container and
7 a burner positioned thereunder for vaporizing the formaldehyde, and the formaldehyde vapor passes or is emitted into the container or chamber 1 and beneath the vibrating screen 5, over which the material to be treated passes. The formaldehyde vapor or fumes passes from the container 1 through a damper-controlled conduit or stack 7'. The material or substance treated passes from the vibrating screen 5 into a chamber 8, and from this chamber the material is fed by means of a rotating paddle or wheel 9. The lower portion of the chamber 8 beneath the rotating paddle or wheel 9 has a blast pipe or nozzle 10 for discharging a blast of hot air into said chamber. The blast pipe or nozzle 10 is secured to an air heating chamber 11 in which the air may be heated to the required temperature by means of a burner 12.

13 indicates an ammonia container, which has secured to it a discharge pipe 14 and a controlling valve 15. The ammonia is fed from the container 13 into the chamber 11, preferably in the form of a spray, the amount of which may be regulated by means of the valve 15.

16 indicates a fan blower for supplying air to the chamber 11, and the air is supplied from this fan blower 16 to the pipe connection 17 which discharges into the chamber 11. The air in passing through the chamber 11 is heated to the required temperature, and is forced out of the chamber 11 through the pipe or nozzle 10 by means of the fan blower 16.

The material, after having been treated with vapors of formaldehyde, is subjected to a hot air blast from the pipe or nozzle 10, which blast of hot air, it is believed, will eliminate any of the formaldehyde vapor which is mechanically held by the substance, or the blast of hot air may be impregnated with ammonia vapor, which acts as a reagent and eliminates any odor that might be present. The agent employed should be one that kills or destroys the insect egg or cell, thus preventing it from developing into larvæ or other insects, and it should be one that destroys the larvæ or insect itself without entering into any chemical combination or union with the substance treated. The formaldehyde fumes or vapors, it is believed, will destroy not only the insect or larvæ germ, that is, the egg or germ cell, but should there be any larvæ or insect present on the substance treated, it will likewise destroy them, and will not, it is believed, enter into any chemical combination or union with the rolled oats, rice or like substance, and should any of the vapor or fumes be mechanically held by the substance treated, it is entirely removed by subjecting the substance to the action of a blast of hot air of a temperature not to affect the chemical constituents of the substance, or a blast of hot air may be employed impregnated with ammonia fumes or vapor.

In practice I may employ any form of apparatus for carrying out my process, and in an application executed by me on October 10, 1911, and serially numbered 653,938, I have claimed an apparatus for such purpose.

I claim:

1. The process of treating rolled oats, rice, and like substances, which consists in subjecting them to the action of a gaseous germicidal agent and then subjecting them to the action of a blast comprising hot air.

2. The process of treating rolled oats, rice, and like substances, which consists in subjecting them to the action of a gaseous germicidal agent and then subjecting them to the action of a blast of hot air impregnated with ammonia fumes.

3. The process of treating rolled oats, rice, and like substances, which consists in subjecting them to the action of the vapors of formaldehyde and then to the action of a blast comprising hot air.

4. The process of treating rolled oats, rice, and like substances, which consists in subjecting them to the action of the vapors of formaldehyde and then to the action of a blast of hot air impregnated with the fumes of ammonia.

5. The process of treating cereals for the purpose of destroying insects and insect germs, which consists in subjecting the cereal while in motion to the action of a germicidal agent and then to the action of a blast comprising hot air for eliminating from the cereal all traces of the germicidal agent.

6. The process of treating cereals for the purpose of destroying insects and insect germs, which consists in subjecting the cereal while in motion to the action of a germicidal agent and then to the action of a blast of hot air impregnated with ammonia fumes for eliminating from the cereal all traces of the germicidal agent.

7. The process of treating cereals for destroying insects, or their germs thereon, which consists in first subjecting the cereal to the action of gaseous formaldehyde and then subjecting the cereal thus treated to the action of a blast comprising hot air.

In testimony whereof, I have signed my name to this specification, in presence of two subscribing witnesses.

EDWARD W. HOOKER.

Witnesses:
E. L. WALLACE,
EDWARD E. LONGAN.